United States Patent [19]

Rodi et al.

[11] Patent Number: 4,558,216

[45] Date of Patent: Dec. 10, 1985

[54] SAFETY DEVICE FOR DETERMINING IMPROPER TAKEOVER OF SHEETS BY A BLANKET CYLINDER

[75] Inventors: Anton Rodi; Udo Blasius, both of Leimen; Dieter Uhrig, Eberbach, all of Fed. Rep. of Germany

[73] Assignee: Heidelberger Druckmaschinen AG, Heidelberg, Fed. Rep. of Germany

[21] Appl. No.: 445,698

[22] Filed: Dec. 1, 1982

[30] Foreign Application Priority Data

Jun. 1, 1982 [JP] Japan .................................. 57-92254

[51] Int. Cl.[4] .......................... G01V 9/04; B65H 25/02

[52] U.S. Cl. .................................... 250/223 R; 226/45

[58] Field of Search ..................... 226/45, 20; 250/561, 250/548, 223 R, 559

[56] References Cited

U.S. PATENT DOCUMENTS 3,264,630 8/1966 Conklin et al. ...................... 250/561
3,439,176 4/1969 Astley et al. ......................... 250/561
3,515,883 6/1970 Akamatsu et al. .................... 226/45
3,684,890 8/1972 Hayne et al. ......................... 250/561
4,310,153 1/1982 Kikuchi ........................... 250/223 R
4,365,151 12/1982 Fasig et al. ...................... 250/223 R
4,417,148 11/1983 Otake .................................. 250/561

*Primary Examiner*—David C. Nelms
*Assistant Examiner*—J. Jon Brophy
*Attorney, Agent, or Firm*—Herbert L. Lerner; Laurence A. Greenberg; Adam A. Jorgensen

[57] ABSTRACT

Checking device for protecting against faults arising from a paper wind-up in a rotary printing machine having a printing unit with a blanket cylinder and a printing-unit protecting grid, the checking device including at least one control device disposed in stationary relationship with respect to and adjacent the blanket cylinder and upstream in travel direction of paper through the printing machine, of a location at which the paper wind-up is produced and including a photoelectric sensor formed as a contrast measurement detector for scanning the blanket of the blanket cylinder and generating a signal when a print product is present, the sensor being mounted on the protecting grid at a lower region thereof and being foldable away together with the protecting grid.

14 Claims, 5 Drawing Figures

SAFETY DEVICE FOR DETERMINING IMPROPER TAKEOVER OF SHEETS BY A BLANKET CYLINDER

The invention relates to a checking device for protecting against operating faults arising from paper wind-ups in a rotary printing machine, the checking device including at least one control device disposed on stationary relationship with respect to and adjacent the blanket cylinder and behind or upstream of a location at which the paper wind-up is produced, as viewed in travel direction of paper through the printing machine. The control device is coupled with a circuit which releases the control of machine operations, the control device having a photoelectric sensor formed as a light-/dark contrast measurement detector for generating a signal when a print product is present.

In rotary printing machines, it is necessary, for checking or safety and control purposes, to determine the presence of a sheet and the position thereof, respectively, at various locations in the machine, for example, in the feeder, on sheet transfer cylinders, in folding apparatus or in the delivery in order to register missing sheets and those having an incorrect position, respectively, and, if necessary or desirable, to permit the switching off of individual machine operations, switching-off of the entire machine or the sorting-out of the incorrect sheets.

But not only the aforedescribed occurrence of stoppages due to the non-appearance of paper on normally paper-conducting cylinders but also in contrast therewith, also the occurrence of paper on cylinders which normally do not conduct paper in a rotary printing machine, can lead to considerable disruptions of operation and cause of damage.

Thus, a device has become known from the Japanese Published Prosecuted Petty Patent No. 56-42053 which, insofar as it is concerned with monitoring the paper guidance in a rotary printing machine, determines the adhesion of a print product to the blanket covering as well as the wind-up thereof around the blanket cylinder and prevents corresponding consequent damage by switching off the machine. For this purpose, a photoelectric sensor is provided which is assigned to the blanket cylinder, detects or monitors the latter, and is constructed as a light/dark contrast measurement detector. The difference in contrast between the blanket cylinder and a sheet possibly adhering thereto results in a fault signal which has the effect of switching-off the machine.

Independently of the fact that narrow limits are set due to the absence of suitable adjustment and matching possibilities of this device, in the aforementioned publication, the possibility of an often necessary contrast-direction change, for example, when using light blanket coverings and dark print sheets, is not provided. Furthermore, the great danger of soiling the photoelectric sensor in the device disclosed in the aforementioned publication, especially when washing the blanket cylinder, is a considerable disadvantage which must be mentioned.

It is accordingly an object of the invention to provide a control device non-susceptible to trouble for monitoring paper guidance in a rotary printing machine which, although held to simple construction and minimal cost, operates with the greatest reliability, and is especially suited for reliable control of the blanket cylinder, in order to prevent efficiently and early the enclosure of sheets in the inking unit.

In accordance with another object of the invention, a control device is provided which excludes any danger of soiling, especially, the photoelectric sensors when the blanket covering is being washed, a fact which is supposed to be of advantage, especially to an increased operational reliability.

In accordance with a further object of the invention, the control device provided, and especially the photoelectric sensor matches, in a relatively simple manner, the respective facts for processing different print carriers (types of paper) and for using different blanket coverings. Especially the noise or sound threshold of the control device is adjustable to the respective existing contrast between the blanket covering and the paper.

In accordance with an added object of the invention, a control device is provided which is automatically matched with the respective aforementioned relationships.

In accordance with an additional object of the invention, a control device and, especially, a photoelectric sensor, are provided which are adjustable to a specific tolerance range (limit values) within which a fault signal is excluded, and outside of which, a fault signal is released.

With the foregoing and the objects in view, there is provided according to the invention, a checking device for protecting against faults arising from a paper wind-up in a rotary printing machine having a printing unit with a blanket cylinder and a printing-unit protecting grid, the checking device including at least one control device disposed in stationary relationship with respect to and adjacent the blanket cylinder and upstream, in travel direction of paper through the printing machine, of a location at which the paper wind-up is produced and comprising a photoelectric sensor formed as a contrast measurement detector for scanning the blanket of the blanket cylinder and generating a signal when a print product is present, the sensor being mounted on the protecting grid at a lower region thereof and being foldable away together with the protecting grid.

In accordance with another aspect of the invention, there is provided, a checking device for protecting against faults arising from a paper wind-up in a rotary printing machine having a blanket cylinder with a blanket covering, the checking device including at least one control device disposed in stationary relationship with respect to and adjacent the blanket cylinder and upstream of a location at which the paper wind-up is produced, considered in travel direction of paper through the printing machine, the control device including a photoelectric sensor formed as a contrast measurement detector generating a signal when a print product is present and comprising means for matching different degrees of reflection of the blanket covering and the print product and, selectively, upon the occurrence of a change in contrast direction, adjusting the control device to a respective one of the relationship "Light print product—dark blanket" and "dark print product—light blanket".

In accordance with a further aspect of the invention there is provided, a checking device for protecting against faults arising from a paper wind-up in a rotary printing machine having a blanket cylinder with a blanket covering, comprising at least one control device disposed in stationary relationship with respect to and adjacent the blanket cylinder and comprising a photoelectric sensor formed as a contrast measurement detector for generating a signal when a print product is present, the control device being constructed so as to match automatically different degrees of reflection of the blanket covering and print product.

In accordance with another feature of the invention, a plurality of the photoelectric sensors disposed over the width of the blanket cylinder in accordance with the format width of the print product being processed, the photoelectric sensors being mounted on the printing-unit protecting grid and being individually switchable on and off. In accordance with an additional feature of the invention, each of the photoelectric sensors is longitudinally displaceable with respect to the axis of the blanket cylinder.

In accordance with a further feature of the invention there is provided means for manually setting a given threshold value in the matching means between the degrees of reflection of the blanket covering and the print product, means for generating a logic signal when the threshold value is exceeded by an output signal from the photoelectric sensor, switchable inversion means having an input for an output signal from the matching means, a control member connected to the inversion means and responsive to a respective contrast direction, respectively, between the blanket covering and the print product for issuing a command, respectively, to invert and not-invert the output signal of the matching means and produce a corresponding fault signal.

In accordance with still another feature of the invention, the blanket cylinder is formed with a longitudinal channel in the cylindrical surface thereof, and including a cylinder-channel screening device connected to the control device for preventing a fault message from being transmitted by the photoelectric sensor, upon detection thereby of the channel formed in the blanket cylinder, if the contrast direction of the print-product degree of reflection matches that of the channel degree of reflection.

In accordance with yet a further feature of the invention, the channel screening device includes an interrogation switch for generating an output signal, for suppressing a fault message to an evaluating device of the matching means during a phase wherein the cylinder channel is detected.

In accordance with an added feature of the invention, the blanket cylinder is formed with a longitudinal channel in the cylindrical surface thereof, and including memory means activatable for storing a fault message only during paper travel.

In accordance with yet a further feature of the invention, the blanket cylinder is formed with a longitudinal channel in the cylindrical surface thereof and including memory means activatable for storing a fault message only during a phase beyond the cylinder-channel phase.

In accordance with still another feature of the invention, there is provided a means for displaying or indicating a fault, the fault indicating means, during a period when paper travel is not introduced into the machine, serving as an adjustment display or indication during adjustment of the photoelectric sensors.

In accordance with still an added feature of the invention, the sensor has an output signal having a value, and including a memory device for storing the output signal value during paper travel and feeding it to a threshold-value former for forming from the stored value, respectively, at least one of an upper and a lower threshold value, and comparator means which, when the threshold value is exceeded and not reached, respectively, by an instantaneous output signal of the sensor, releases a fault signal.

In accordance with still an additional feature of the invention the sensor has an output signal having a value, and including a memory device for storing the output signal value during a phase when the cylinder channel is detected and feeding it to a threshold-value former for forming from the stored value, respectively, at least one of an upper and a lower threshold value, and comparator means which, when the threshold value is exceeded and not reached, respectively, by an instantaneous output signal of the sensor, releases a fault signal.

In accordance with a concomitant feature of the invention the sensor has an output signal having a value, and including a memory device for storing the output signal value during paper travel and during a phase when the cylinder channel is detected and feeding it to a threshold-value former for forming from the stored value, respectively, at least one of an upper and a lower threshold value, and comparator means which, when the threshold value is exceeded and not reached, respectively, by an instantaneous output signal of the sensor, releases a fault signal. Other features which are considered as characteristic for the invention are set forth in the appended claims.

Although the invention is illustrated and described herein as embodied in a blanket checking device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
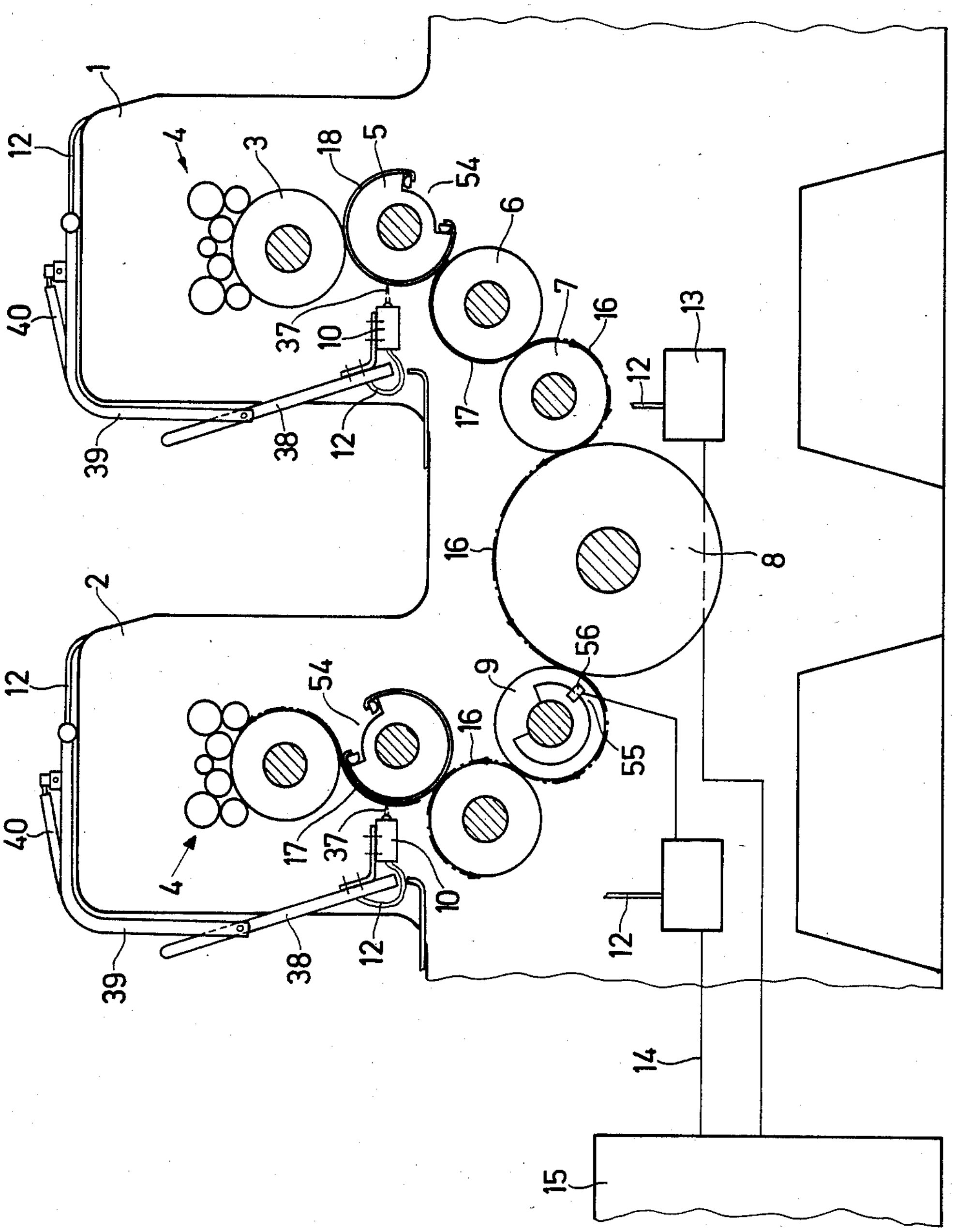
FIG. 1 is a diagrammatic side elevational view of a two-color sheet-fed rotary printing machine with a respective photoelectric checking device according to the invention at each printing unit.

Referring now to the drawing and first, particularly, to FIG. 1 thereof, there is shown a two-color sheet-fed rotary printing machine wherein the two printings 1 and 2 thereof are represented diagrammatically by, respectively, a plate cylinder 3, an inking unit 4 in engagement therewith, a blanket cylinder 5 as well as an impression cylinder 6. The printing units 1 and 2 are connected to one another via three sheet transfer cylinders 7, 8 and 9 which transfer a sheet 17 from the first printing unit 1 to the second printing unit 2. A photoelectric sensor 10 is disposed in a lower region of a printing-unit protecting grid 38, opposite the blanket cylinder 5 and directed toward the cylindrical surface of the latter. The printing-unit protecting grid 38 is held by a swing frame 39 pivotally disposed in an upper region of the printing unit. A pneumatic spring 40 for damping the pivoting movement of the swing frame 39 engages the latter, in turn. Error signals 30 deriving from the sensor 10 are transmitted via a connecting line 12 likewise attached to the printing-unit protecting grid 38 and the swing frame 39. The sensor 10 provides a test beam which is directed towards the blanket 18. Depending upon the need and the width or breadth of paper format to be processed, additional photoelectric sensors may obviously be assigned to the blanket cylinder 5, the additional sensors being either stationary or, if desired or necessary, longitudinally displaceable with respect to the axis of the blanket cylinder 5. Coupling with an electronic evaluating circuit 13 (note also FIG. 2) is effected via a line 12, the evaluating circuit 13 being in turn, connected via lines 14 with a release circuit 15 (note also FIG. 2), which is accommodated in a switch-box.

Figure 2:
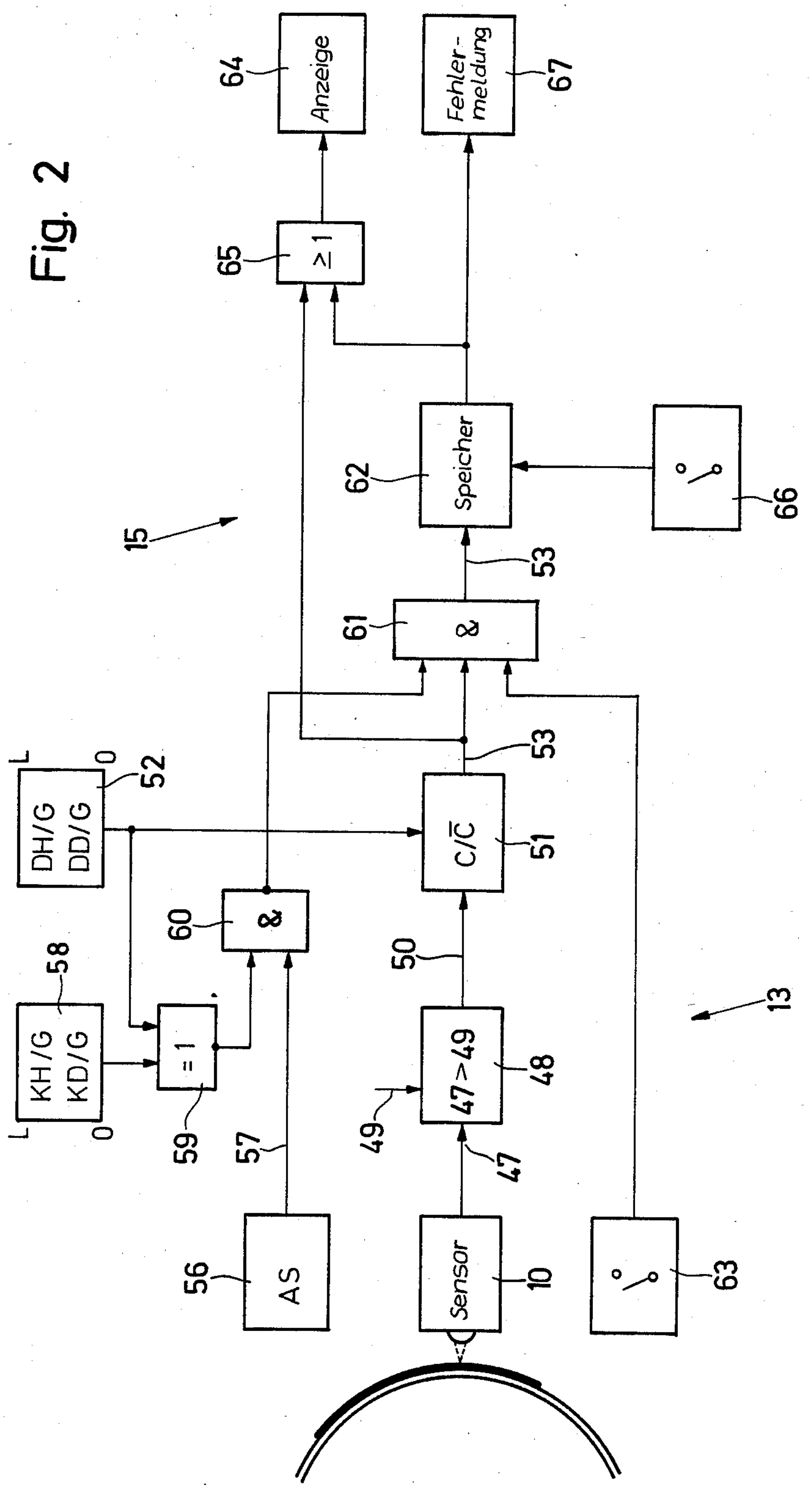
FIG. 2 is a schematic circuit diagram of an entire control system incorporating the invention.

FIG. 2 is a circuit diagram showing the control system in simplified form which is described in greater detail herein after with respect to the operation thereof.

During normal operation of the two-color sheet-fed rotary printing machine, the blanket cylinder 5, as represented in the first printing unit 1 of the two-color sheet-fed rotary printing machine in FIG. 1 and as illustrated by the phantom line representing the sheet course 16, is not permitted to guide any printed product, in this case no sheet 17, because the sheet 17 is printed in the nip or gap between the blanket cylinder 5 and the impression cylinder 6 and then transferred by the sheet transfer cylinder 7, 8 and 9 to the second printing unit 2. If a sheet 17 then remains adherent to the blanket cylinder 5 during the operation of the machine as represented in the second printing unit 2 in FIG. 1 and winds itself around the blanket cylinder 5, the test beam 37 of one of the photoelectric sensors thus perceives this sheet 17 due to the difference in contrast thereof with respect to a previously located or oriented blanket, and thereby releases an error message to the electronic evaluation circuit 13, which occurs independently of whether or not the sheet 17 is scanned or probed at the leading or trailing edge thereof, a fact which is quite significant in perfector printing.

The sensors 10 disposed opposite the blanket cylinder 5 of the two printing units 1 and 2, also have the function of continuously probing or scanning the blanket cylinder 5 and the blanket 18, respectively. The sensors 10, which are constructed as contrast-measuring detectors yield or deliver an output signal 47 equivalent to the degree of reflection of the detected or sensed object, as represented in FIG. 2. The voltage of the output signal 47 is determined by an evaluation device and is thus evaluated so that after a comparison thereof with a threshold voltage 49, a logic signal 50 is available containing the proposition: higher reflection degree/lower reflection degree. The amount of the threshold voltage 49 is adjustable and is determined by the extent or degree of reflection of the blanket 18. In the device according to the invention, it is manually adjusted in an advantageous manner so that the threshold value lies somewhat in the middle between the degree of reflection of the blanket 18 and that of the printed product 17. The association or assignment of the logic level O and L, respectively, of the evaluation device 48 is advantageously released so that a switchable inversion system 51, which has been provided, permits an error message both with the detection of a light printed product 17 (high reflection degree) with respect to that of the blanket 18, as well as with the detection of a dark printed product 17 (low reflection degree) with respect to that of the blanket 18. A control member 52 determining this association or assignment described hereinafter in greater detail, may be both a manually actuated switch as well as yet another sensor which is coupled with the evaluation device 48. If a sheet 17 remains adherent to the blanket 18 during operation of the machine, as represented in the second printing unit 2 in FIG. 1, the evaluation device 48 detects this due to the change of the sensor output signal 47, and releases an error signal 53 which is further processed by the succeeding control device. Because in all sheet-fed printing machines, however, the blanket 18 does not completely enclose or surround the blanket cylinder 5, but rather a so-called "channel" 54 (FIG. 1) exists which represents an additional contrast variation with respect to the blanket 18 which is being used, the objective additionally results of preventing an error message when the channel 54 is detected, at least if the contrast direction of the printed product-reflection degree is identical with that of the channel-reflection degree. This is solved in accordance with the invention, by providing a channel-screening or masking device 55 (FIG. 1) containing an interrogation switch 56 firmly connected to the machine, which produces a suitable output signal 57 during the channel phase and, accordingly, suppresses an error message to the evaluation device 48 depending upon a selector switch 58 via a combinatorial circuit formed of EX-NOR 59, NAND 60 and AND 61. In general, monitoring during the channel phase may be avoided, and the selector switch 58, EX-NOR 59 and NAND 60 may be dispensed with.

At the output of the control member 52, there is, for example, the logic level L when the printed product 17 (DH/G) is light with respect to the blanket 18, while the logic level O exists for the printed product 17 (DD/G) which is light with respect to the blanket 18.

At the output of the selector switch 58, suitable relationships for the extend or degree of reflection if the channel 54 with respect to the blanket 18 apply.

In another embodiment of the invention, the control device is constructed so that a storage device or memory 62 is provided which may be activated by means of an AND member 61 only during paper travel or beyond the channel phase because, only when the paper is travelling, is, for example, the logic lever L applied to an input of the AND 61 by the switch 63. If this memory 62 is set, an error message 67 is given to the machine control and an error display or indication 64 is activated simultaneously via the OR-gate 65. This memory 62 and the error display or indication 64 may be erased or cancelled by a reset key 66. When paper travel has not been introduced, the error indication 64 may also be used as an adjustment indication, because the error signal 53 is tapped off even before the AND 61 and is applied via the NOR 65 to the error indication 64 and, in this case, the adjustment indication, respectively.

Figure 3:
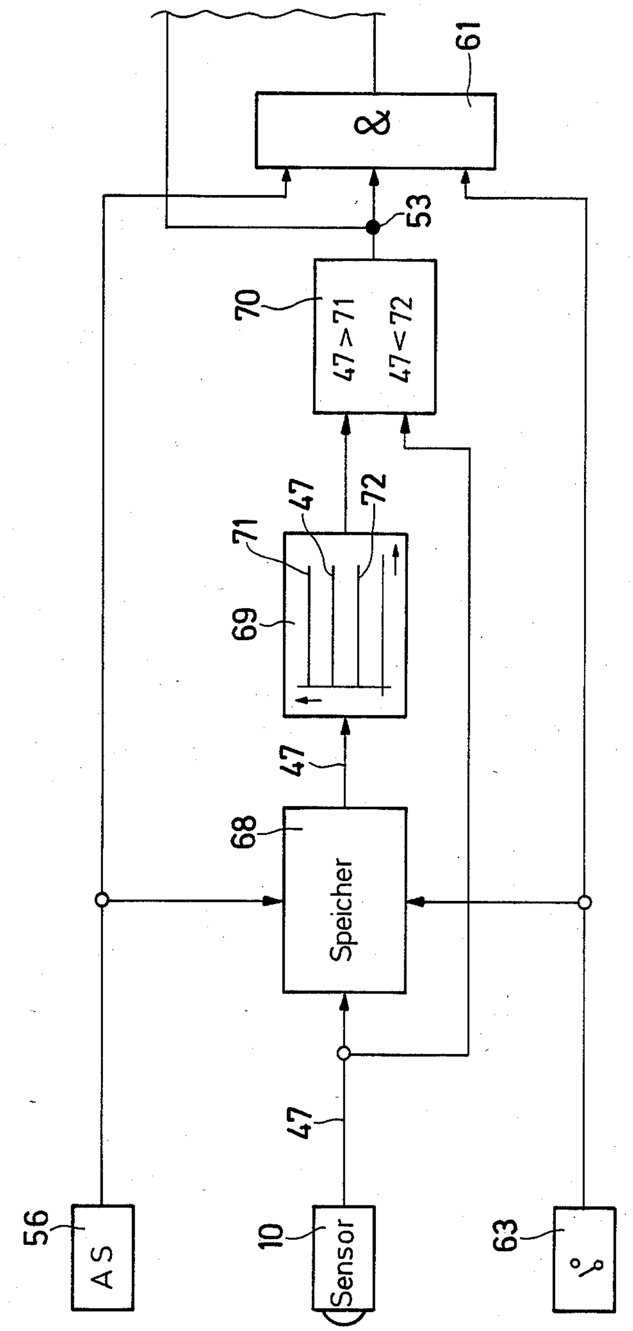
FIG. 3 is a fragmentary view of FIG. 2 showing an alternate elevation circuit of the control system.
Figure 4:
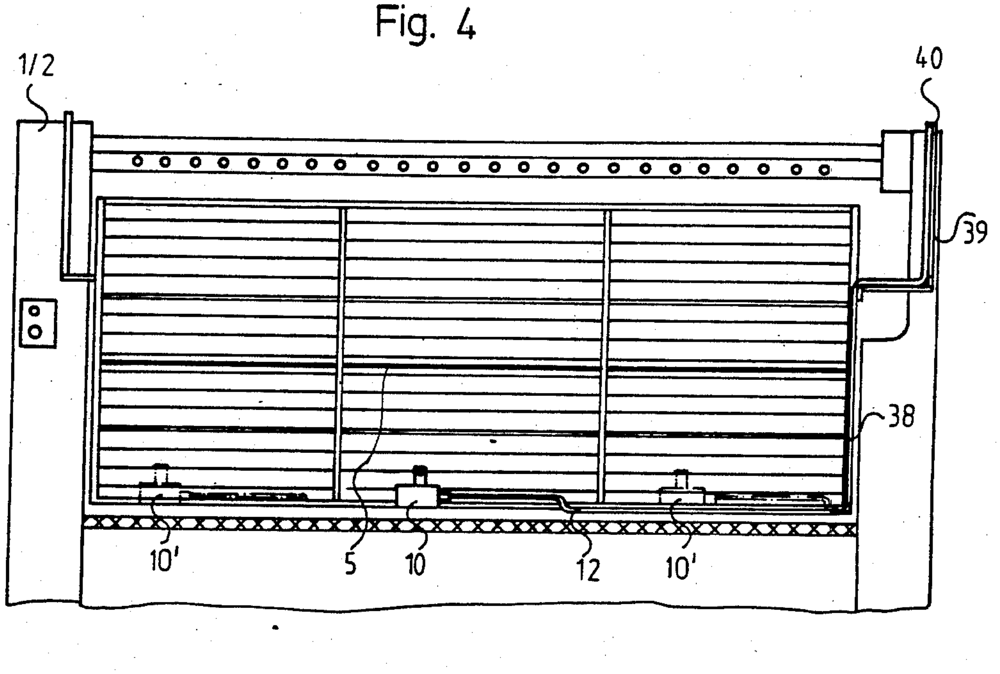
FIG. 4 shows the multiple photoelectric sensors stationed across the cylinder
Figure 5:
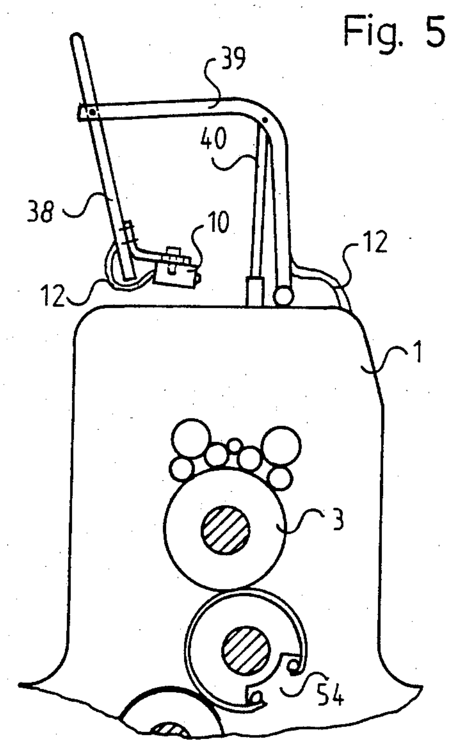
FIG. 5 is a side view of the photoelectric sensor on a foldable grid.

In yet another embodiment of the invention, instead of the evaluation circuit 13 of FIG. 2, and evaluation circuit formed of a memory 68, a threshold former 69 and a comparator 70 are proposed, which contains an automatic adjustment to or matching of the blanket 18 being used. In addition, as shown in FIG. 3, the output signal 47 of the sensor 10 is applied to a memory 68 which, during paper travel and/or during the channel phase, stores the value of the output signal 47 applied directly before. The content of the memory 68 corresponds thus always to the degree of reflection of the blanket 18. The following threshold former 69 forms from this stored value an upper and/or a lower threshold value 71, 72 which, when exceeded and not reached, respectively, by the instantaneous output signal of the sensor 10, results in the release of an error signal 53 by the comparator 70, the error signal 53 with the signal "Paper travel" and the signal of the channel blocking or screening device 55 (answering switch 56) reaching the memory 62 via the hereinforedescribed combinatorial circuit (AND-gate 61 and so forth).

Naturally, the electronic evaluation system of the invention is not limited to the special embodiments represented in FIGS. 2 and 3 and expressly described in this specification, which should be considered only as examples of an invention having many more possibilities and should in no way limit the invention. It is believed to be self-evident that the electronic evaluation system may be realized also through the use of numerous other electronic elements or components readily obtainable in the market place. Likewise, all light-reflection detectors or other photoelectric sensors operating with light-/dark contrast fall within the scope of the invention, just as is the application of the invention to roll-fed or web rotary printing machines.

The foregoing is a description corresponding to Japanese Application No. 92-254/82, filed June 1, 1982, the International Priority of which is being claimed for the instant application, and which is hereby made part of this application. Any discrepancies between the foregoing specification and the aforementioned Japanese Application are to be resolved in favor of the latter.

We claim:

1. Checking device for protecting against faults arising from a paper wind-up in a rotary printing machine having a printing unit with a blanket cylinder formed with a cylinder channel and a printing-unit protecting grid, foldable into and out of operating position the checking device including at least one control device disposed in stationary relationship with respect to and adjacent the blanket cylinder and upstream, in travel direction of paper through the printing machine, of a location at which the paper wind-up is produced and comprising a photoelectric sensor formed as a contrast measurement detector for scanning the blanket of the blanket cylinder and generating a signal when a print product is present, said sensor being mounted on the protecting grid at a lower region thereof and being foldable out of operating position together with said protecting grid.

2. Checking device according to claim 1 including a plurality of said photoelectric sensors disposed over the blanket cylinder in axial direction thereof and in accordance with the format width of the print product being processed, said photoelectric sensors being mounted on the printing-unit protecting grid and being individually switchable on and off.

3. Checking device according to claim 2 wherein the blanket cylinder has a longitudinal axis and wherein each of said photoelectric sensors is longitudinally displaceable with respect to the axis of the blanket cylinder.

4. Checking device for protecting against faults arising from a paper wind-up in a rotary printing machine having a blanket cylinder with a blanket covering, the checking device including at least one control device disposed in stationary relationship with respect to and adjacent the blanket cylinder and upstream of a location at which the paper wind-up is produced, as viewed in travel direction of paper through the printing machine, the control device including a photoelectric sensor formed as a contrast measurement detector generating a signal when a print product is present and comprising means for matching different degrees of reflection of the blanket covering and the print product and, selectively, upon the occurrance of a change in contrast direction, adjusting the control device to a respective one of the relationship "light print product—dark blanket" and "dark print product—light blanket".

5. Checking device according to claim 4 including means for manually setting a given threshold valve in said matching means between the degrees of reflection of the blanket covering and the print product, means for generating a logic signal when said threshold valve is exceeded by an output signal from said photoelectric sensor, switchable inversion means having an input for an output signal from said matching means, a control member connected to said inversion means and responsive to a respective contrast direction, respectively, between the blanket covering and the print product for issuing a command, respectively, to invert and not-invert said output signal of said matching means and produce a corresponding fault signal.

6. Checking device according to claim 4 wherein the blanket cylinder is formed with a longitudinal channel in the cylindrical surface thereof, and including a cylinder-channel screening device connected to the control device for preventing a fault message from being transmitted by the photoelectric sensor, upon detection thereby of the channel formed in the blanket cylinder, if the contrast direction of the print-product degree of reflection matches that of the channel degree of reflection.

7. Checking device according to claim 6 wherein said channel screening device includes an interrogation switch for generating an output signal, for suppressing a fault message to an evaluating device of said matching means during a phase wherein said cylinder channel is detected.

8. Checking device according to claim 4 wherein the blanket cylinder is formed with a longitudinal channel in the cylindrical surface thereof, and including memory means activatable for storing a fault message only during paper travel.

9. Checking device according to claim 4 wherein the blanket cylinder is formed with a longitudinal channel in the cylindrical surface thereof and including memory means activatable for storing a fault message only during a phase beyond the cylinder-channel phase.

10. Checking device according to claim 4 including means for displaying or indicating a fault, said fault indicating means, during a period when paper travel is not introduced into the machine, serving as an adjustment display or indication during adjustment of the photoelectric sensors.

11. Checking device for protecting against faults arising from a paper wind-up in a rotary printing machine having a blanket cylinder with a blanket covering, comprising at least one control device disposed in stationary relationship with respect to and adjacent the blanket cylinder and comprising a photoelectric sensor formed as a contrast measurement detector for generating a signal when a print product is present, said control device being constructed so as to match automatically different degrees of reflection of the blanket covering and print product.

12. Checking device according to claim 11 wherein said sensor has an output signal having a value, and including a memory device for storing said output signal value during paper travel and feeding it to a threshold-value former for forming from said stored value, respectively at least one of an upper and a lower threshold value, and comparator means which, when the upper threshold value is exceeded and the lower threshold value is not reached, respectively, by an instantaneous output signal of said sensor, releases a fault signal.

13. Checking device according to claim 11 wherein said sensor has an output signal having a value, and including a memory device for storing said output signal value during a phase when the cylinder channel is detected and feeding it to a threshold-value former for forming from said stored value, respectively, at least one of an upper and a lower threshold value, and comparator means which, when the threshold value is exceeded and not reached, respectively, by an instantaneous output signal of said sensor, releases a fault signal.

14. Checking device according to claim 11 wherein said sensor has an output signal having a value, and including a memory device for storing said output signal value during paper travel and during a phase when the cylinder channel is detected and feeding it to a threshold-value former for forming from said stored value, respectively, at least one of an upper and a lower threshold value, and comparator means which, when the upper threshold value is exceeded and the lower threshold value is not reached, respectively, by an instantaneous output signal of said sensor, releases a fault signal.

* * * * *